(12) United States Patent
Roberts

(10) Patent No.: US 7,758,052 B2
(45) Date of Patent: Jul. 20, 2010

(54) SEAL ASSEMBLY

(75) Inventor: Michael C. Roberts, Bristol (GB)

(73) Assignee: Rolls-Royce plc, London (GB)

( * ) Notice: Subject to any disclaimer, the term of this patent is extended or adjusted under 35 U.S.C. 154(b) by 266 days.

(21) Appl. No.: 11/812,172

(22) Filed: Jun. 15, 2007

(65) Prior Publication Data

US 2008/0067753 A1 Mar. 20, 2008

(30) Foreign Application Priority Data

Sep. 19, 2006 (GB) .................................. 0618365.1

(51) Int. Cl.
*F16J 9/20* (2006.01)
*F16J 15/00* (2006.01)

(52) U.S. Cl. ....................... 277/436; 277/438; 277/491; 277/498

(58) Field of Classification Search ................. 277/436, 277/438, 458, 467, 491, 496, 497, 498, 499
See application file for complete search history.

(56) References Cited

U.S. PATENT DOCUMENTS

| | | | |
|---|---|---|---|
| 3,866,923 A * | 2/1975 | Gorman | 277/576 |
| 4,957,212 A * | 9/1990 | Duck et al. | 277/467 |
| 5,575,484 A | 11/1996 | Burke | |
| 5,618,048 A * | 4/1997 | Moriarty et al. | 277/489 |
| 6,416,058 B1 * | 7/2002 | Zygmunt | 277/436 |
| 7,140,291 B2 * | 11/2006 | Dunaevsky et al. | 92/253 |
| 2005/0098959 A1 | 5/2005 | Uhrner | |

FOREIGN PATENT DOCUMENTS

EP 0 902 220 A2 3/1999

\* cited by examiner

*Primary Examiner*—Vishal Patel
(74) *Attorney, Agent, or Firm*—Oliff & Berridge, PLC

(57) ABSTRACT

The present invention provides a seal assembly for sealing between two relatively slideable members of non-circular cross-section. A plurality of adjacent seal members may be staggered and grouped within a groove so that all leakage surfaces between the two relatively slideable members are sealed. Multiple seal members or seal member groups may be used to reduce leakage caused by incomplete contact of the seal members with leakage surfaces. An actuator system may comprise various embodiments of the present invention to enable the actuation of one member in relation to another.

14 Claims, 4 Drawing Sheets

SEAL ASSEMBLY

The invention concerns a seal assembly. In particular the invention relates to a seal member for sealing a gap between a chamber and piston of non-circular cross-section.

In a cylindrical chamber and a cylindrical piston arrangement it is known to use an annular ring seal within a peripheral groove of the piston. The ring seal not only prevents leakage by sealing the gap between the piston and chamber but also acts as a spacer to prevent both surfaces rubbing together and causing uneven wear which would impede free movement. Such ring seals have a gap that permits compression for fitting and are made of resilient material to allow for expansion to ensure a seal. It is also known to use pistons with a plurality of adjacent peripheral grooves each of which contain a ring seal. The length of leakage path created by the gaps in the ring seals may be maximised by staggering the seals to minimise overall leakage across the piston ends.

However a circular split ring seal is unsuitable for a non-circular chamber and piston since the different shapes prevent an evenly distributed contact seal. The present invention aims to provide a seal member effective in non-circular chamber and piston arrangements.

According to an aspect of the present invention there is provided a seal assembly for sealing between two relatively slideable members of non-circular cross-section comprising a seal member located in a groove formed in one of the members and having a seal portion and a means for biasing which in use presses against one slideable member to urge the seal portion into sealing contact with the other slideable member.

For a better understanding of the present invention and to show how it may be carried into effect, reference will now be made, by way of example, to the accompanying drawings, in which:

FIG. 3 is a cross-section view through line B-B of FIG. 1; and.

Figure 1:
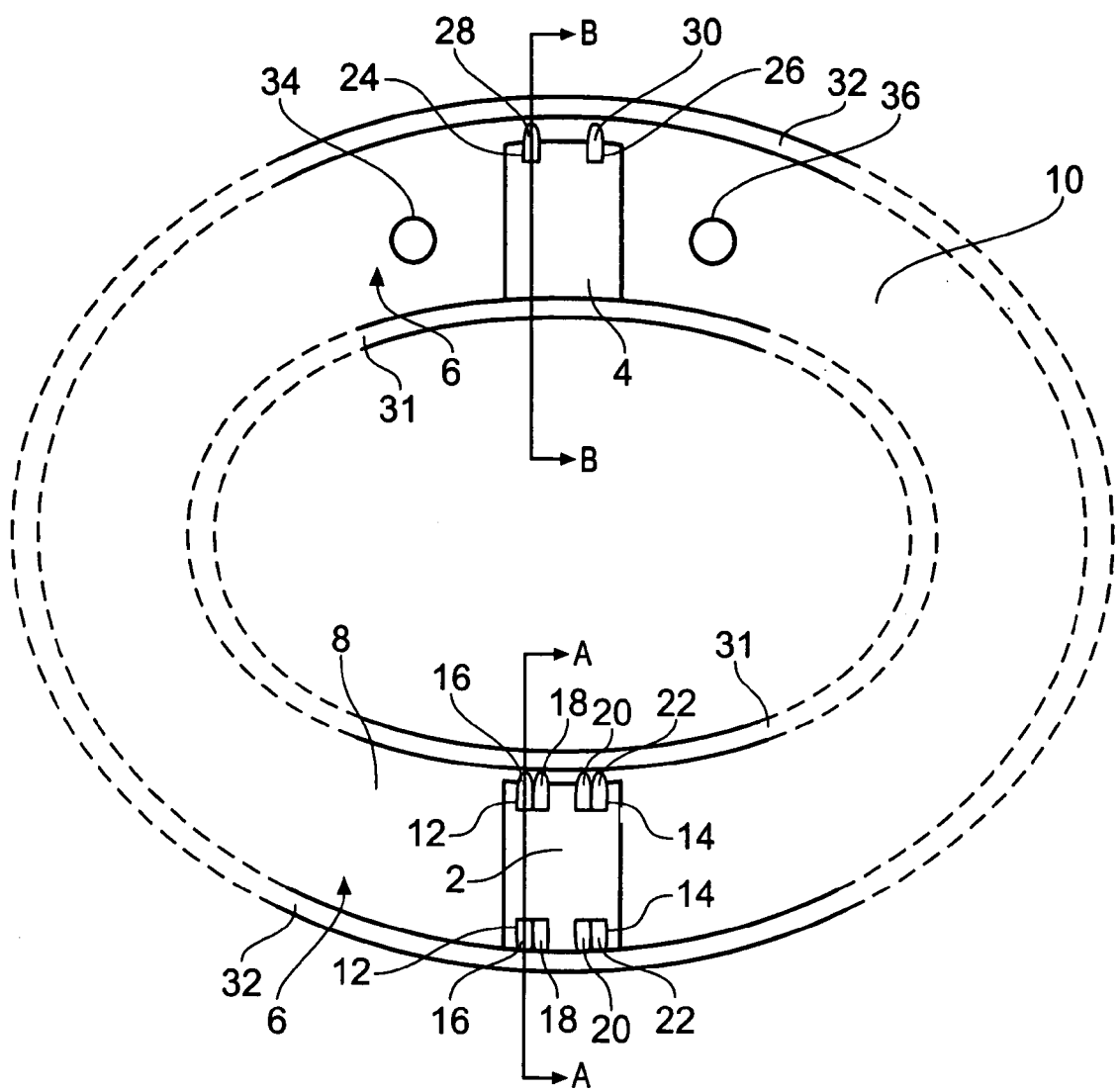
FIG. 1 is a cross-section view of an actuator system comprising two pistons located within an annular chamber.

With reference to FIG. 1, an actuator system comprises an annular chamber 6 and two pistons, 2 and 4. Pistons 2 and 4 are located within annular chamber 6 to form two chamber regions, 8 and 10. Two grooves, 12 and 14 are formed around the periphery of piston 2 and each contains two seal members, 16, 18 and 20, 22 respectively. Two grooves, 24 and 26 are formed along one surface of piston 4 and each contains a single seal member, 28 and 30 respectively. Annular chamber 6 is formed from an annular part 31 of U-shaped cross-section, hereinafter called the channel section and a radially outer ring 32 of oblong cross-section, hereinafter called the top section. Top section 32 is joined to channel section 31 to form a lid over the channel enclosing annular chamber 6 between them. Piston 2 is free to move with respect to channel section 31 but fixed to top section 32 while piston 4 is free to move with respect to top section 32 but fixed to channel section 31. Two apertures, 34 and 36 are provided in channel section 31 to enable fluid to be injected or evacuated from chamber regions 8 and 10 respectively.

Figure 2:
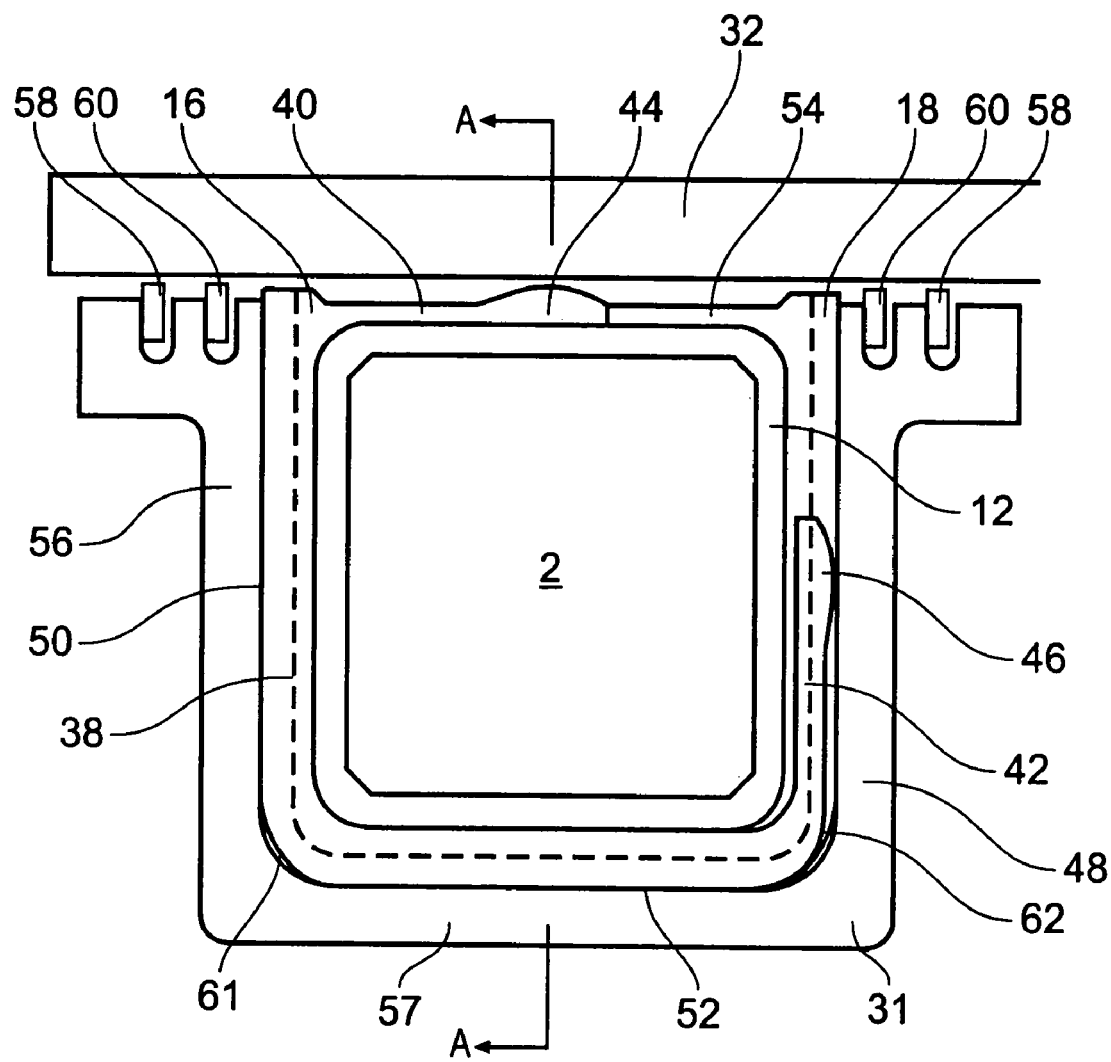
FIG. 2 is a cross-section view through line A-A of FIG. 1.

With reference to FIG. 2, seal member 16 is located within peripheral groove 12 of piston 2 and comprises an L-shaped seal portion 38, flanked by two resilient bias arms, 40 and 42. Both arms 40 and 42 are outwardly biased and each is provided with a raised feature towards its distal end, 44 and 46 respectively. Arm 40 is parallel to top section 32 and arm 42 is parallel to a wall 31 of channel section 48. Two sealing surfaces of seal portion 38, 50 and 52, are positioned against two channel section walls, 56 and 57 respectively. Seal member 18 is identical to seal member 16 and is positioned behind seal member 16 also within groove 12 of piston 2. Seal member 18 is arranged with an arm, 54 parallel to top section 32 and another arm (not shown) parallel to wall 56 of channel section 31. Piston 2 is free to move with respect to channel section 31 but fastened and sealed to top section 32. Two seals, 58 and 60 allow top section 32 to slide in relation to channel section 31 while completely sealing the joint. In operation arms 40 and 42 of seal member 16 bear against top section 32 and channel section wall 48 to urge sealing surfaces 50 and 52 of seal portion 38 into sealing contact with channel section walls 56 and 57. Positioning seal member 16 in this way provides a seal along walls 56 and 57 of channel section 31 but permits leakage along wall 48 of channel section 31. By the same process, positioning arm 54 of seal member 18 against top section 32 and the other arm (not shown) against channel section wall 56 provides a seal along channel section walls 48 and 57 but permits leakage along channel section wall 56. Using seal members 16 and 18 in staggered formation provides combined sealing along channel section walls 48, 56 and 57. Due to incomplete contact of seal members 16 and 18 leakage paths still remain at two inner corners of channel section 31, 61 and 62, however the effects of these are minimal compared with the leakage prevented along channel section walls 48, 56 and 57.

Figure 3:
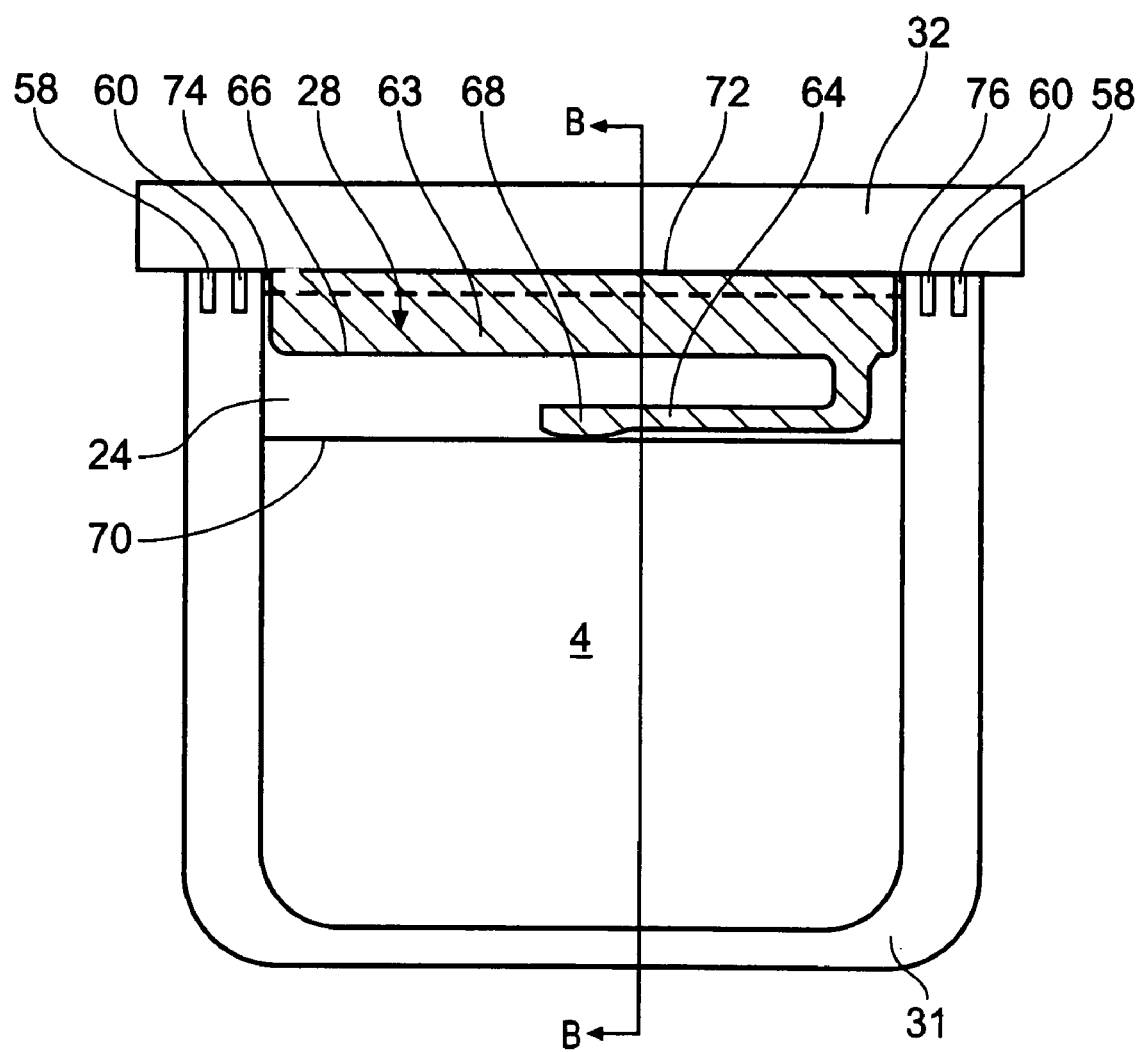

With reference to FIG. 3, seal member 28 is located within groove 24 of piston 4 and comprises an oblong seal portion 63 with a resilient bias arm, 64 extending from its non-sealing length, 66. Arm 64 is outwardly biased and provided with a raised feature 68 towards its distal end. Arm 64 is parallel to top section 32 and presses against an inner surface of piston groove 24, 70. A sealing surface of seal portion 63, 72, presses against top section 23. Piston 4 is free to move with respect to top section 32 but fastened and sealed to channel section 31. As before, seals 58 and 60 allow top section 32 to slide with respect to channel section 31 while completely sealing the joint. In operation arm 64 of seal member 28 bears against inner surface 70 of piston groove 24 to urge sealing surface 72 into sealing contact with top section 32. Positioning seal member 28 in this way provides a seal along top section 32. Leakage paths still remain at two points along top section 32, 74 and 76, however the effects of these are minimal compared with the leakage prevented along the remaining surface of top section 32.

Clockwise actuation of the actuator system diagrammatically shown in FIG. 1 is achieved by injecting fluid into chamber region 10 through aperture 36 and evacuating fluid from chamber region 8 through aperture 34. Pistons 2 and 4 in combination with their respective seal member groups 16, 18, 20, 22 and 28, 30, form a barrier to prevent fluid exchange between chamber regions 8 and 10. Multiple seal member pairs are fitted to piston 2 and multiple seal members are fitted to piston 4 to further reduce the leakage caused by incomplete contact of any individual seal member. Piston 4 is fixed to channel section 31 and remains stationary while fluid enters through aperture 36 and exits through aperture 34. Piston 2 is fixed to top section 32 and is free to move in relation to channel section 31. As fluid pressure increases in chamber region 10, piston 2 is pushed around annulus chamber 6 in a clockwise direction causing top section 32 to slide clockwise over stationary channel section 31.

A similar process achieves anti-clockwise actuation; this time fluid is injected into chamber region 8 through aperture 34 and evacuated from chamber region 10 through aperture 36. Pistons 2 and 4 together with seal members 16, 18, 20, 22, 28 and 30 isolate chamber regions 8 and 10. Apertures 34 and 36 provide means to increase fluid pressure within chamber region 8 and reduce fluid pressure within chamber region 10 to actuate piston 2 and top section 32 anti-clockwise.

Figure 4:
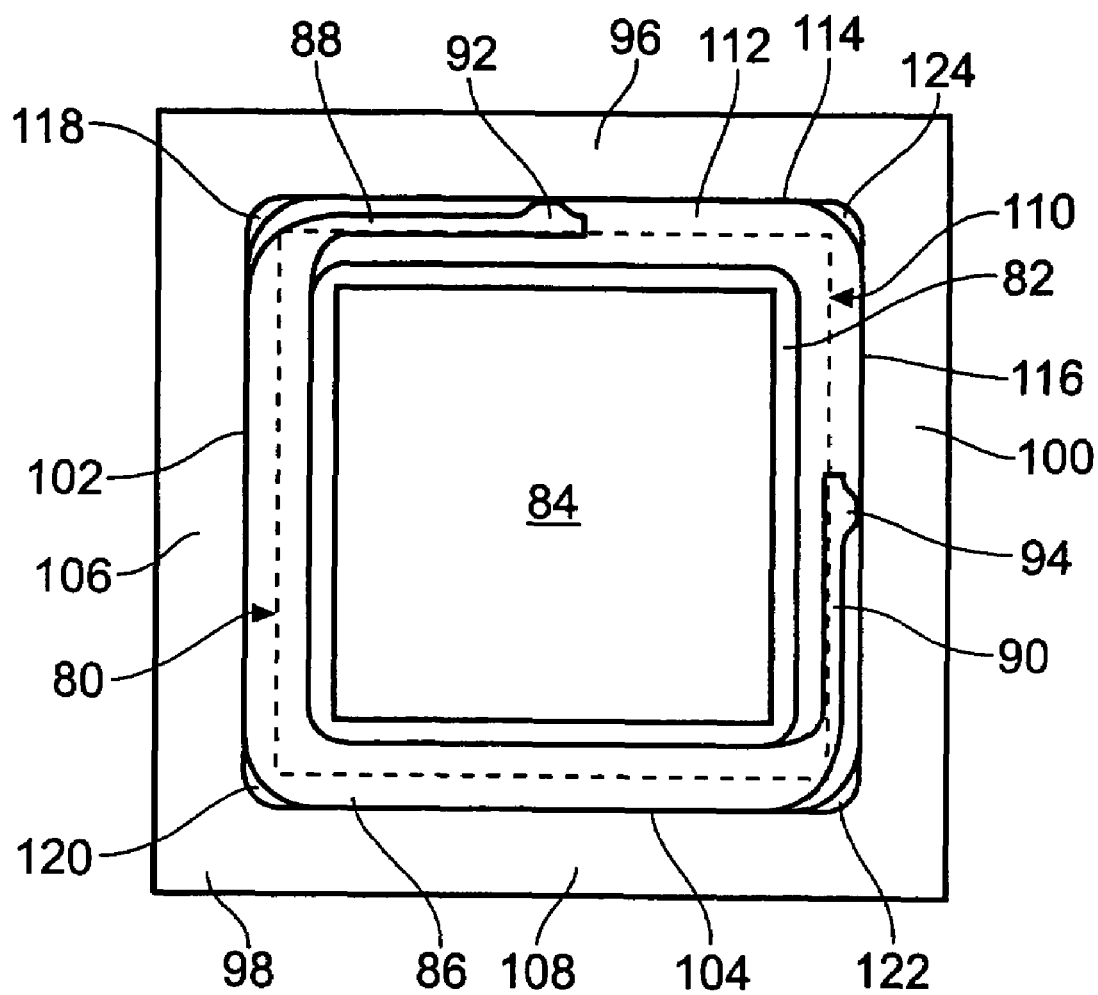
FIG. 4 is a cross-section view of an alternative piston and chamber arrangement.

With reference to FIG. 4, seal member 80 is located within peripheral groove 82 of piston 84 and comprises an L-shaped seal portion 86, flanked by two resiliently biased arms, 88, 90. Both arms 88, 90 are outwardly biased and each is provided with a raised feature towards its distal end 92, 94 respectively. Arm 88 is parallel to wall 96 of chamber 98 and arm 90 is parallel to wall 100 of chamber 98. Two sealing surfaces of seal portion 86, (identified as 102, 104 in FIG. 4) are positioned against chamber walls 106, 108 respectively. A seal member 110, which is identical to seal member 80, is positioned behind seal member 80 also within groove 82 of piston 84. Seal member 110 is arranged with an arm (not shown) parallel to wall 108 of chamber 98, another arm (not shown) parallel to wall 108 of chamber 98, and seal portion 112, with two sealing surfaces 114, 116 positioned against chamber walls 96, 100 respectively Piston 84 is free to move with respect to chamber 98. In operation arms 88, 90 of seal member 80 bear against chamber walls 96, 100 to urge sealing surfaces 102, 104 of seal portion 86 into sealing contact with chamber walls 106, 108 respectively. Positioning seal member 80 in this way provides a seal along chamber walls 106, 108 of chamber 98 but permits leakage along chamber walls 96, 100. By the same process positioning one arm (not shown) of seal member 110 against chamber wall 106 and the other arm (not shown) against chamber wall 108 provides a seal along chamber walls 96, 100 but permits leakage along chamber walls 106, 108. Using seal members 80, 110 in this alternative staggered formation provides combined sealing along all chamber walls 96, 100, 106, 108. Due to incomplete contact of seal members 80, 110 leakage paths exist at inner chamber corners 118, 120, 122, 124, however these effects are minimal compared with the leakage prevented along chamber walls 96, 100, 106, 108.

Although aspects of the invention have been described with reference to the embodiments shown in the accompanying drawings, it is to be understood that the invention is not limited to those precise embodiments and that various changes and modifications may be effected without further exercise of inventive skill and effort. For example, the present invention also contemplates embodiments where the two relatively slideable members are of any non-circular cross-section, such as elliptical. In any case the invention requires that the seal portion of the seal member, seals those surfaces of the relatively slideable members that it is aligned with and that in combination with other adjacent seal members, multiple seal portions may be staggered to effectively seal all leakage paths. According to the present invention sealing may be further enhanced by combining seal members or multiple groups of staggered seal members to reduce leakage caused by incomplete contact of the sealing surfaces of any seal member on the inner surfaces of the chamber.

Further modifications to the present invention could be to vary the material stiffness or the dimensions of the resilient bias arms to alter the force with which they press against one of the slideable members to urge the seal portion into sealing contact with the other slideable member.

The invention claimed is:

1. A seal assembly for sealing two relatively slideable members, one of the two relatively slideable members defining a groove having first, second and third portions, the second portion connecting and being perpendicular to the first and third portions, the first and third portions extend from the second portion, the seal assembly comprising:
at least two one-piece unitary seal members, the first one-piece unitary seal member having first, second, and third sections disposed in the first, second and third portions of the groove of the one of the relatively slideable members, the second one-piece unitary seal member having first, second and third sections disposed in the third, second and first portions of the groove of the one of the relatively slideable members, respectively, the third section of the first one-piece unitary seal member being shorter than the first section and including a resilient biasing arm, the third section of the second one-piece unitary seal member being shorter than the first section and including a resilient biasing arm, the one-piece unitary seal members each defining a fourth section that is parallel to the second section, the fourth section including a resilient biasing arm, the first and second sections of the first one-piece unitary seal member and the first and second sections of the second one-piece unitary seal member being substantially L-shaped.

2. The seal assembly of claim 1 wherein the first and second relatively slideable members are of a substantially polygonal cross-section and the first and second sections of the one-piece unitary seal members have at least one matching substantially straight side.

3. The seal assembly of claim 1 wherein the resilient bias arms of the one-piece unitary seal members define a substantially square-shaped seal member.

4. The seal assembly of claim 3 wherein a length of each resilient bias arm is approximately half a length portion of the first section of the one-piece unitary seal members.

5. The seal assembly of claim 1 wherein the distal ends of the resilient bias arms contact a surface of the other of the two relatively slideable members, which is a non-grooved member.

6. The seal assembly of claim 1 wherein the relatively slideable members are of an elliptical cross-section.

7. The seal assembly of claim 1 wherein two sections of the one-piece unitary seal members are substantially oblong.

8. The seal assembly of claim 7 wherein the resilient bias arms extend from a non-sealing length of the one-piece unitary seal members.

9. The seal assembly of claim 4 wherein an outer surface of each resilient bias arm is provided with a raised feature towards its distal end.

10. The seal assembly of claim 8 wherein an outer surface of each resilient bias arm is provided with a raised feature towards its distal end.

11. The seal assembly of claim 4 wherein at least one resilient bias arm is outwardly biased.

12. The seal assembly of claim 8 wherein at least one resilient bias arm is outwardly biased.

13. The seal assembly of claim 12 wherein the first and second one-piece unitary seal members are staggered.

14. The seal assembly of claim 1, wherein at least one of the resilient biasing arms provides a sealing contact that is substantially planar in the longitudinal direction of the two relatively slideable members.

* * * * *